United States Patent
Leverick

Patent Number: 5,085,318
Date of Patent: Feb. 4, 1992

[54] SECURED DISC FOLDER

[76] Inventor: Kathy L. Leverick, 6345 Janes La., Naples, Fla. 33942

[21] Appl. No.: 615,323

[22] Filed: Nov. 19, 1990

[51] Int. Cl.⁵ .............................................. B65D 85/57
[52] U.S. Cl. .................... 206/312; 206/309; 206/311; 206/444; 206/493; 206/495
[58] Field of Search .............. 206/303, 309, 310, 311, 206/312, 313, 444, 492, 232, 494, 493, 495; 229/72; 493/946

[56] References Cited

U.S. PATENT DOCUMENTS

| | | | |
|---|---|---|---|
| 1,316,885 | 9/1919 | Fletcher | 206/311 |
| 2,512,577 | 6/1950 | Franck | 206/312 |
| 3,430,761 | 3/1969 | Pelkey | 206/309 |
| 3,547,342 | 12/1970 | Smith | 206/309 |
| 3,717,297 | 2/1973 | Perry | 206/312 |
| 3,870,223 | 3/1975 | Wyant | 229/72 |
| 4,425,999 | 1/1984 | MacDonald et al. | 206/312 |
| 4,429,787 | 2/1984 | Morse | 229/72 |
| 4,473,153 | 9/1984 | Colangelo | 206/312 |
| 4,709,812 | 12/1987 | Kosterka | 206/311 |

FOREIGN PATENT DOCUMENTS

| | | | |
|---|---|---|---|
| 335826 | 10/1989 | European Pat. Off. | 206/309 |
| 1317316 | 1/1963 | France | 206/312 |
| 404515 | 1/1934 | United Kingdom | 206/310 |

*Primary Examiner*—David T. Fidei
*Attorney, Agent, or Firm*—Merrill N. Johnson

[57] ABSTRACT

A folder for holding, displaying and securing a compact disc made from a single sheet of card stock. The rectangular sheet is folded into three equal rectangular sections and a semicircular section is cut out of one of the two end sections of the sheet leaving a semicircular tab at the center of the cut out section. The diameter of the semicircular cut out section is sized slightly larger than the diameter of the compact disc. Glue is applied to the end section of the sheet containing the cut out and that section is folded over and glued to the center section of the sheet, thus forming a pocket sized to receive one half of a compact disc. The semicircular tab is sized to cover that portion of the compact disc surrounding the hole in its center so that a plastic rivet passing through the semicircular tab, the hole in the disc and the center section of the sheet of card stock will secure the disc within the folder. Appropriate information such as instructions or a message can be printed on one or both sides of the end section of the sheet which does not carry the disc and which serves as the cover of the folder.

4 Claims, 1 Drawing Sheet

SECURED DISC FOLDER

BACKGROUND AND SUMMARY OF THE INVENTION

The invention relates to a container for a compact disc and more particularly to an inexpensive, space saving folder which displays the compact disc and yet secures the disc from removal from the folder.

Compact discs are presently sold and used throughout the United States and abroad in great numbers. Containing recordings of a wide range of musical selections, lectures, instructions and advertising, the sale, display, storage and safekeeping of compact discs is a growing business today.

Most compact discs today are packaged by their manufacturer in a hinged rigid plastic container measuring about 5 by 5½ inches and ⅜ths of an inch thick, weighing with the disc inside about 5 ounces. Most containers are made of crystal clear plastic and printed panels visible through the container identify and advertise the particular disc within the container. Removal of the disc from the container during its display before purchase by the ultimate owner is prevented usually by a sealed clear plastic film covering the entire rigid plastic container.

Opening and closing of most rigid plastic containers for compact discs is difficult for most users of the discs. Altho carrying cases for a plurality of compact disc containers are available, storage of the rigid plastic containers wastes considerable space due to the great bulk of the container in relation to the size of the compact disc which is only about 4¾ inches in diameter and less than 1/16th of an inch thick.

I have invented a container for compact discs which is far less expensive and takes much less space than the conventional hinged rigid plastic containers in use today. My unique container is made from a single sheet of card stock formed into a folder which attractively displays the compact disc while securing the disc against removal from the folder.

Briefly stated, my folder for a conventional 4¾ diameter compact disc is preferably made from a rectangular sheet of card stock which measures about 15 by 7 inches. The sheet is folded into three equal sections each measuring 5 by 7 inches. A semicircular section with the diameter of the semicircle parallel to the folds in the sheet is cut out of one of the end sections of the sheet but leaving a semicircular tab about an inch in diameter located at the center of the diameter of the cut out section. The diameter of the cut out section is a little bit larger than the diameter of the compact disc.

The end section of the sheet is then folded over and glued to the adjacent center section of the sheet to form a pocket which is sized to receive one half of a compact disc, with the semicircular tab covering the hole in the center of the disc and the area of the disc immediately surrounding the hole.

The purpose of the tab is to provide means for securing the disc within the folder and prevent its removal until the disc is finally purchased. Alternative means for securing the disc within the folder have been developed.

First, a plastic rivet such as used to attach labels onto clothing can be passed through the tab, the hole in the compact disc and the center section of the sheet of card stock, thereby securing the disc within the folder until the disc is purchased by its ultimate user.

Alternatively, a layer of adhesive material can be spread on the undersurface of the semicircular tab which, when pressed down firmly against the area of the disc surrounding the hole in its center, will join the tab to the upper surface of the disc, thereby securing the disc within the folder.

The end section of the sheet serves as the cover of the folder which protects the disc from damages such as scratches and pilferage. The cover can also be used for printed advertising or other messages and to identify the disc within the folder.

Although developed for compact discs, my folder can also be used to display and store the so-called floppy discs used in large quantities in the computer industry. There being various sizes of floppy discs, my folder should be made in a number of sizes to accomodate all the different sized floppy discs.

DETAILED DESCRIPTION OF THE PREFERRED EMBODIMENT

Figure 1:
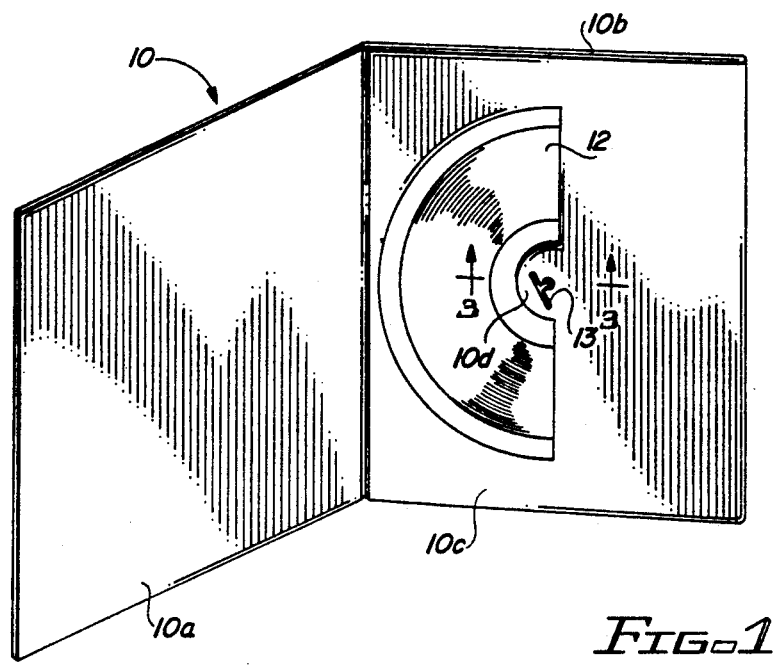
FIG. 1 is a perspective view of my secured disc folder shown in an open position with a compact disc securely fastened in the pocket of the folder.

Referring first to FIG. 1 of the drawing, a preferred form of my secured disc folder 10 is shown in an opened position. Folder 10 is made from a single sheet of high quality 12 point card stock approximately 1/32 inches in thickness. The card stock may be any color but I have found white to be preferable so that any printing made on the surfaces of the folder will be clearly visible for easy reading.

Folder 10 is designed for displaying and storing disc 12 which is 4¾ inches in diameter and approximately 1/16th of an inch in thickness. The folder is made from a sheet of 12 point card stock measuring 15 inches in length and 7 inches wide. The sheet is scored along two parallel lines 10e and 10f so the sheet is divided into three equal 5 by 7 inch sections 10a, 10b and 10c as best shown in FIG. 2.

Figure 2:
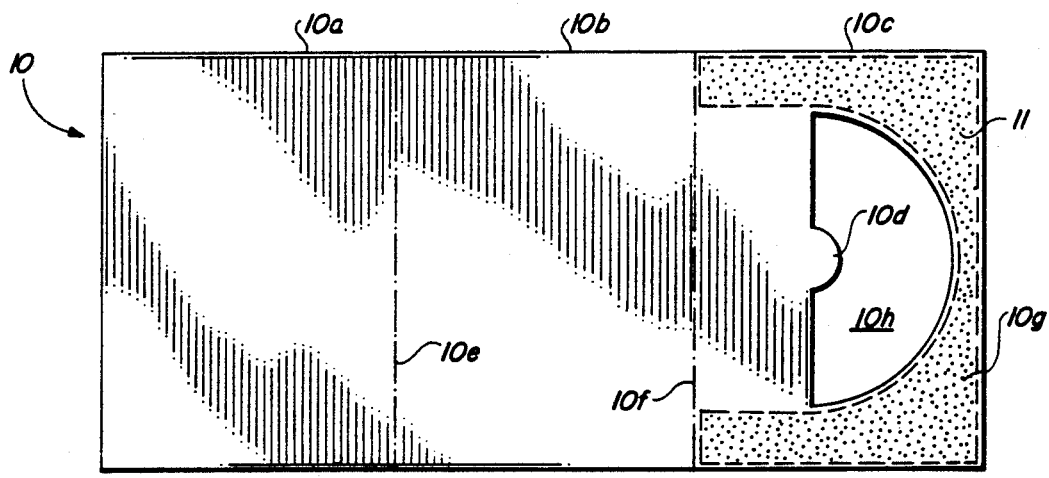
FIG. 2 is an unassembled plan view of my folder taken from above showing the semicircular cut out area and the area covered by glue.

A semicircular section 10h having a radius of 2 7/16ths of an inch with its diameter parallel to scored fold line 10f and its apex ⅛th of an inch from the edge of sheet 10 is cut out or stamped out of section 10c, but leaving a semicircular tab 10d about one inch in diameter located at the center of the diameter of cut out section 10h, all as shown in FIG. 2.

That portion of end section 10c bounded by dotted lines and marked 10g is coated with glue 11, and then end section 10c is folded along scored line 10f onto center section 10b to form a pocket sized to receive one half of compact disc 12 as shown in FIG. 1 with semicircular tab 10d covering the upper surface of the disc immediately surrounding the hole in its center.

Tab 10d serves as means to secure the compact disc within folder 10 and to prevent removal of disc 12 until the disc and its folder are purchased by its ultimate user. Various means for securing the disc within the folder may be used and two of these are shown in FIGS. 3 and 4.

Figure 3:
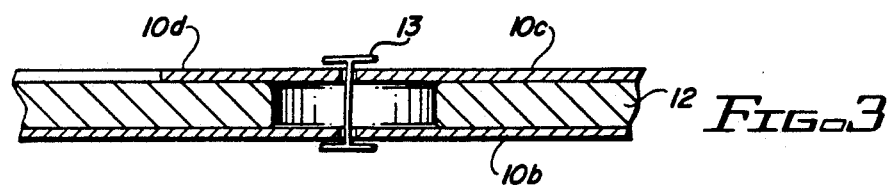
FIG. 3 is a detailed cross-sectional view of that portion of the secured disc folder shown along line 3—3 in FIG. 1.

In FIG. 3 a plastic rivet 13 of the type used to attach labels onto clothing is passed through tab 10d, the hole in the center of compact disc 12 and center section 10b of folder 10, thus securing disc 12 within folder 10 from the time of manufacture until finally purchased by the user of the disc.

Figure 4:
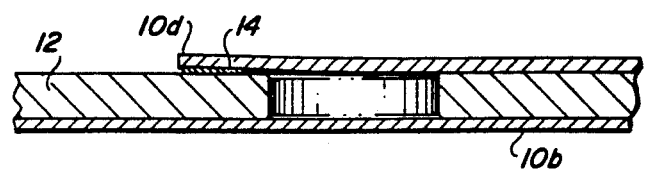
FIG. 4 is a detailed cross-sectional view similar to FIG. 3 showing an alternative means for securing the compact disc to the folder.

In FIG. 4 a layer of adhesive material 14 is spread on the undersurface of tab 10d which is pressed down firmly against the upper surface of disc 12 adjacent its center to join tab 10d to disc 12 and secure the disc within folder 10 from the time of its manufacture until purchase by the ultimate user.

End section 10a is folded along scored line 10e to cover compact disc 12 secured within the pocket formed by sections 10b and 10c and thus protects the exposed upper surface of disc 12 from damage during shipment and storage. The surfaces of section 10a and also the rear surface of center section 10b can be used for pre-printed advertising or other information identifying and promoting the sale of disc 12.

My folder for shipping, displaying and storing compact discs, and also floppy discs, can be manufactured at a fraction of the cost of conventional hinged rigid plastic containers now in use for compact discs. Moreover, my folders can safely store in a given space several times the number of compact discs stored in conventional rigid plastic containers.

While I have shown and described a preferred embodiment of my unique secured disc folder and method of making the folder, various modifications and changes and rearrangements will be apparent to those skilled in the art. The foregoing description in no way limits my invention, whose scope is defined only by the appended claims.

I claim:

1. A folder for holding, displaying and securing a compact disc made from a rectangular sheet of card stock,
    said sheet being scored and folded to form three equal rectangular sections,
    a semicircular section being cut out of one of the two end sections of the sheet leaving a semicircular tab at the center of the cut out section,
    the diameter of the semicircular cut out section lying parallel to the sheet's fold and sized slightly larger than the diameter of the compact disc,
    the end section of the sheet containing the cut out being folded over and glued to the center section of the sheet to form a pocket sized to receive one half of the compact disc,
    the semicircular tab sized to cover that portion of the compact disc surrounding the hole in its center,
    a plastic rivet passing through the semicircular tab, the hole in the disc and the center section of the sheet of card stock to secure the disc within the folder, and
    the end section of the sheet which does not carry the disc being folded over the disc to serve as the cover of the folder.

2. A folder for holding, displaying and securing a disc having a hole in its center including a rectangular sheet of card stock,
    said sheet being scored and folded to form three equal rectangular sections,
    a semicircular section being cut out of one of the two end sections of the sheet leaving a semicircular tab at the center of the cut out section,
    the diameter of the semicircular cut out section lying parallel to the sheet's fold and sized slightly larger than the diameter of the disc,
    the end section of the sheet containing the cut out being folded over and glued to the center section of the sheet to form a pocket sized to receive one half of the disc,
    the semicircular tab sized to cover that portion of the disc surrounding the hole in its center, and
    the end section of the sheet which does not carry the disc being folded over the disc to serve as the cover of the folder, and
    means attached to the semicircular tab for securing the disc within the folder.

3. A device for holding, displaying and securing a disc having a hole in its center as set forth in claim 2 in which the means for securing the semicircular tab to the disc consists of a rivet passing through the semicircular tab, the hole in the center of the disc and the center section of the card stock.

4. A device for holding, displaying and securing a disc having a hole in its center as set forth in claim 2 in which the means for securing the semicircular tab to the disc consists of a layer of adhesive material on the underside of the semicircular tab which is pressed down and attached to the surface of the disc adjacent the hole in the disc's center.

* * * * *